United States Patent
Lin et al.

(10) Patent No.: US 11,551,093 B2
(45) Date of Patent: Jan. 10, 2023

(54) RESOURCE-AWARE TRAINING FOR NEURAL NETWORKS

(71) Applicant: Adobe Inc., San Jose, CA (US)

(72) Inventors: Zhe Lin, Fremont, CA (US); Siyuan Qiao, Baltimore, MD (US); Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 1025 days.

(21) Appl. No.: 16/254,406

(22) Filed: Jan. 22, 2019

(65) Prior Publication Data

US 2020/0234128 A1 Jul. 23, 2020

(51) Int. Cl.
*G06K 9/00* (2022.01)
*G06N 3/08* (2006.01)
*G06N 3/04* (2006.01)
*G06K 9/62* (2022.01)

(52) U.S. Cl.
CPC .............. *G06N 3/082* (2013.01); *G06N 3/04* (2013.01); *G06K 9/6257* (2013.01)

(58) Field of Classification Search
CPC ...................................................... G06N 3/082
See application file for complete search history.

(56) References Cited

U.S. PATENT DOCUMENTS

| | | | |
|---|---|---|---|
| 5,835,901 A * | 11/1998 | Duvoisin, III | G06N 3/0454 706/31 |
| 7,778,946 B2 * | 8/2010 | Hercus | G06N 3/082 706/27 |
| 10,387,771 B2 * | 8/2019 | Judd | G06N 3/049 |
| 2009/0119236 A1 * | 5/2009 | Hercus | G06N 3/082 706/27 |
| 2015/0081607 A1 * | 3/2015 | Hunzinger | G06N 3/049 706/26 |
| 2015/0170295 A1 * | 6/2015 | Shen | G06Q 50/01 705/319 |
| 2018/0181867 A1 * | 6/2018 | Seibold | G06K 9/6253 |
| 2019/0042935 A1 * | 2/2019 | Deisher | G06N 3/063 |
| 2020/0234128 A1 * | 7/2020 | Lin | G06N 3/04 |
| 2021/0264278 A1 * | 8/2021 | Liu | G06N 3/0454 |

OTHER PUBLICATIONS

Qiao, Siyuan and Lin, Zhe and Zhang, Jianming and Yuille, Alan; Neural Rejuvenation: Improving Deep Network Training by Enhancing Computational Resource Utilization; https://arxiv.org/abs/1812.00481; 2018 (Year: 2018).*

(Continued)

*Primary Examiner* — Hadi Akhavannik
(74) *Attorney, Agent, or Firm* — FIG. 1 Patents

(57) ABSTRACT

In implementations of resource-aware training for neural network, one or more computing devices of a system implement an architecture optimization module for monitoring parameter utilization while training a neural network. Dead neurons of the neural network are identified as having activation scales less than a threshold. Neurons with activation scales greater than or equal to the threshold are identified as survived neurons. The dead neurons are converted to reborn neurons by adding the dead neurons to layers of the neural network having the survived neurons. The reborn neurons are prevented from connecting to the survived neurons for training the reborn neurons.

20 Claims, 12 Drawing Sheets

(56) References Cited

OTHER PUBLICATIONS

Chen,"DeepLab: Semantic Image Segmentation with Deep Convolutional Nets, Atrous Convolution, and Fully Connected CRFs", May 12, 2017, 14 pages.
Gordon,"MorphNet: Fast & Simple Resource-Constrained Structure Learning of Deep Networks", Apr. 17, 2018, 15 pages.
He,"Deep Residual Learning for Image Recognition", Proceedings of the IEEE conference on computer vision and pattern recognition, 2016., Dec. 10, 2015, 12 pages.
Huang,"Densely Connected Convolutional Networks", Jan. 28, 2018, 9 pages.
Krizhevsky,"ImageNet Classification with Deep Convolutional Neural Networks", In Advances in Neural Information Processing Systems 25, Dec. 3, 2012, 9 pages.
Krizhevsky,"Learning Multiple Layers of Features from Tiny Images", Apr. 8, 2009, 60 pages.
Liu,"Learning Efficient Convolutional Networks through Network Slimming", Aug. 22, 2017, 10 pages.
Simonyan,"Very deep convolutional networks for large-scale image recognition", In Journal of Computing Research Repository, Sep. 2014, 14 pages.
Ye,"Rethinking the Smaller-Norm-Less-Informative Assumption in Channel Pruning of Convolution Layers", Feb. 2, 2018, 11 pages.

* cited by examiner

RESOURCE-AWARE TRAINING FOR NEURAL NETWORKS

BACKGROUND

Neural networks achieve state-of-the-art performance in many tasks, including visual tasks such as image recognition and object detection. However, conventionally-configured neural networks are inefficient in terms of computational resource utilization. This is because only a fraction of the computations the network performs are useful in accomplishing a particular task. In other words, neural networks are often over-parameterized, and as a result of these computational inefficiencies, neural networks have not been well-suited for use on devices that have limited computational resources such as mobile devices. This computer-based problem is not addressed by widely used optimization methods such as stochastic gradient descent. Further, it is not possible to know which parameters of a neural network will be necessary for the network to accomplish a task until the network is at least partially trained to accomplish the task.

SUMMARY

Systems and techniques are described for resource-aware training for neural networks. A computing device implements an architecture optimization system which receives an initial neural network configuration having a specified network architecture. Training of the neural network begins with parameter initialization, and proceeds to optimization where training samples are provided to map an input to an output, and stochastic gradient decent is used to find parameters that minimize a loss function. The architecture optimization system monitors parameter utilization during this training and identifies dead neurons of the network which have little or no impact on the network's ability to reliably accomplish a task. The system can identify the dead neurons as neurons with activation scales below an activation scale threshold to ensure that the dead neurons can be removed from the neural network without significantly changing an output of the neural network for a given input. When parameter utilization is low or below a threshold, the architecture optimization system converts dead neurons to reborn neurons by adding the dead neurons to layers of the network having neurons that are important to the performance of the network. These important neurons are survived neurons, and the system can identify the survived neurons as neurons with activation scales above the activation scale threshold. By adding reborn neurons to network layers having survived neurons, the architecture optimization system may change the network from its initial architecture.

The dead neurons are not desirable because they consume resources which could be used to improve the network. In order to prevent the reborn neurons from becoming dead neurons again, the architecture optimization system prevents reborn neurons from connecting to survived neurons. In this way, the architecture optimization system ensures that reborn neuron inputs connect to reborn neuron outputs and survived neuron inputs connect to survived neuron outputs. This is necessary because the survived neurons already have at least some training to accomplish the task but the reborn neurons have just been reinitialized and are only capable of contributing noise. As a result, in scenarios where reborn neurons are not prevented from connecting to the survived neurons, the network will further learn to use the survived neurons and avoid using the reborn neurons causing the reborn neurons to become dead neurons again. By preventing the reborn neurons from connecting to the survived neurons, the reborn neurons can be separately trained and become useful for accomplishing the task. Thus, the dead neurons are no longer wasting computational resources and separately training these neurons as reborn neurons improves the network's performance by adding resources to the network where the resources are needed to accomplish the task.

One way to train the survived neurons and the reborn neurons separately is to generate adversarial training examples from training examples used to train either one of the survived or reborn neurons, and then use the adversarial training examples to train the other one. By generating the adversarial training examples from the training examples, the survived neurons and the reborn neurons can be trained to provide different but complementary information in order to accomplish the task with greater accuracy.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
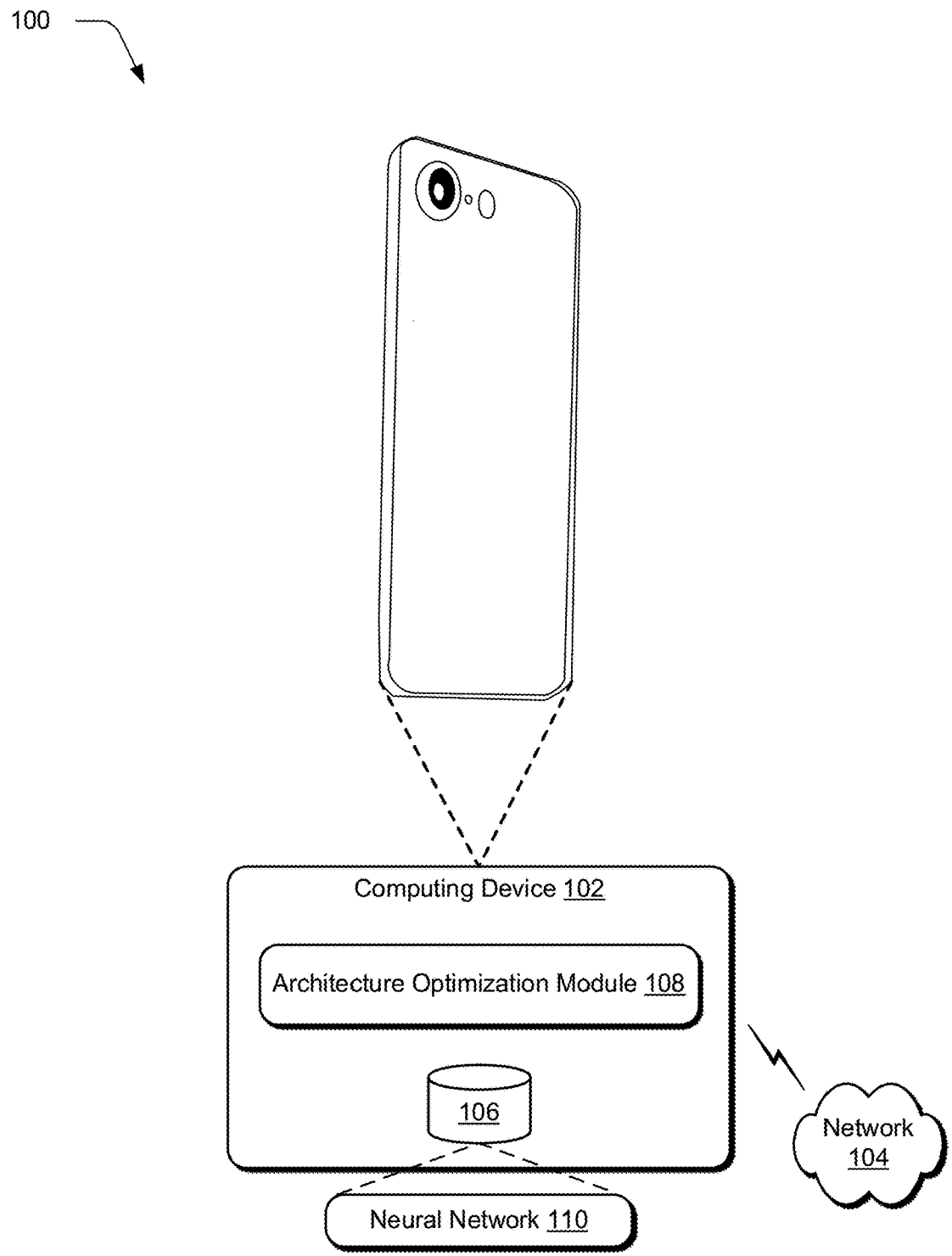
FIG. 1 is an illustration of an environment in an example implementation that is operable to employ digital systems and techniques as described herein.

Neural networks achieve state-of-the-art performance in many tasks, including visual tasks such as image recognition and object detection. However, conventionally-configured neural networks are inefficient in terms of computational resource utilization because only a fraction of the computations the network performs are useful in accomplishing a particular task. Thus, neural networks are often over-parameterized, and as a result of these computational inefficiencies, neural networks have not been well-suited for use on devices that have limited computational resources such as mobile devices. Commonly used optimization methods do not address the problem of neural network parameter utilization. Accordingly, preventing over-parameterization of neural networks presents a technological challenge.

To overcome the above-discussed problems with neural networks, a computing device implements an architecture optimization system which receives an initial neural network configuration having a specified network architecture. Training of the neural network begins with parameter initialization, and proceeds to optimization where training samples are provided to map an input to an output, and stochastic gradient decent is used to find parameters that minimize a loss function. The architecture optimization system includes a utilization monitoring module that monitors parameter utilization during this training and identifies dead neurons of the network which have little or no impact on the network's ability to reliably accomplish a task.

These dead neurons are identified by comparing an activation scale of each neuron to a threshold, and if a neuron has an activation scale that is less than the threshold, then the utilization monitoring module identifies the neuron as a dead neuron. Alternatively, if a neuron has an activation scale that is greater than or equal to the threshold, then the neuron is useful in helping the network accomplish the task and the utilization monitoring module identifies the useful neuron as a survived neuron. Once identified, the utilization monitoring module also includes a regularizer to encourage sparsity of the survived neurons.

When the utilization monitoring module determines that parameter utilization is low or below a threshold, for example, a twenty-five percent utilization threshold, the module triggers an event that utilization is low or lower than the threshold. In response to detecting the event, a network morphing module of the architecture optimization system is implemented to convert dead neurons to reborn neurons by adding the dead neurons to layers of the network having survived neurons. The network morphing module adds the reborn neurons to the layers of survived neurons by determining the maximum amount that a survived neuron can be expanded without exceeding a defined resource limit In implementations, for example, the defined resource limit corresponds to a number of parameters, a number of floating point operations per second (FLOPS), etc. By adding reborn neurons to network layers having survived neurons, the network morphing module may change the network from its initial architecture. In this way, the network morphing module allocates the reborn neurons based on the needs of the neural network which results in superior network performance in response to just the one detected event. Additional iterations of reallocation of useless dead neurons to the useful layers further improve the neural network's performance.

The architecture optimization system also includes a life extension module which is implemented to prevent the reborn neurons from becoming dead neurons again by preventing reborn neurons from connecting to survived neurons. This ensures that reborn neuron inputs connect to reborn neuron outputs and survived neuron inputs connect to survived neuron outputs which is necessary because the survived neurons already have at least some training to accomplish the task but the reborn neurons have just been reinitialized and are only capable of contributing noise. As a result, in scenarios where reborn neurons are not prevented from connecting to the survived neurons, the network will learn to use survived neurons and avoid using the reborn neurons causing the reborn neurons to become dead neurons again. Specifically, the reborn-neuron outputs will learn to use the survived inputs heavily and ignore the reborn-neuron inputs and the reborn-neuron outputs will then only produce redundant features because they are sharing inputs with the survived outputs. However, preventing the reborn neurons from connecting to the survived neurons allows the reborn neurons to be separately trained so that they become useful for accomplishing the task.

The separate training can be accomplished by training the survived neurons with a first set of training examples and training the reborn neurons with a second set of training examples where the first and second sets are different and unrelated. Alternatively, the survived neurons and the reborn neurons can be separately trained by generating adversarial training examples from training examples used to train either one of the survived or reborn neurons, and then using the adversarial training examples to train the other one. An adversarial training example can be generated, for instance, by using the survived neurons to produce an attention map from the training example and using the attention map to identify high attention regions of the training example. These regions are separated and recombined so that the features in the regions are in a different orientation than they are in the training example. The reoriented combinations of the high attention regions can be used as an adversarial training example, e.g., for the reborn neurons. Since the attention regions are separated, neurons training on the adversarial training example must classify an object using a different region than neurons training on the corresponding training example used to classify the object. By generating the adversarial training examples from the training examples, the survived neurons and the reborn neurons can be trained to provide different but complementary information in order to accomplish the task with greater accuracy.

Term Descriptions

As used herein, the term "neuron" refers to an artificial neuron (also called a perceptron) which is an elementary unit of a neural network. A neuron is implemented by a computing device to accept a vector of inputs, perform a transformation on the inputs, and output a scalar value.

As used herein, the term "dead neuron" refers to a neuron of a neural network which can be removed from the neural network without significantly changing an output of the network for a given input. By way of example, a dead neuron may be a neuron of a neural network having an activation scale below a threshold or a benchmark.

As used herein, the term "survived neuron" refers to a neuron of a neural network which, if removed from the neural network, would cause a significant change in an output of the network for a given input. By way of example, a survived neuron may be a neuron of a neural network having an activation scale above a threshold or a benchmark.

As used herein, the term "reborn neuron" refers to a neuron of a neural network which was a dead neuron of a first layer of the network but has been reinitialized and moved from the first layer of the network to a second layer of the network.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The computing device 102 includes a storage device 106 and an architecture optimization module 108. The storage device 106 is illustrated to include a neural network 110. The neural network 110 is generally a machine-learning model. As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. According to various implementations, such a machine-learning model uses supervised learning, semi-supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data.

The computing device 102 implements the architecture optimization module 108 to optimize an architecture of the neural network 110 as the neural network is being trained. This optimization is accomplished by monitoring parameter utilization and identifying dead neurons which are neurons that contribute to the computational costs of the neural network 110 but that do not meaningfully contribute to the performance of the network's task. These dead neurons are converted to reborn neurons by adding them to layers of the neural network 110 that have neurons contributing to the performance of the task. In this way, the architecture optimization module 108 improves the performance of the neural network in real-time as resource needs are identified.

Figure 2:
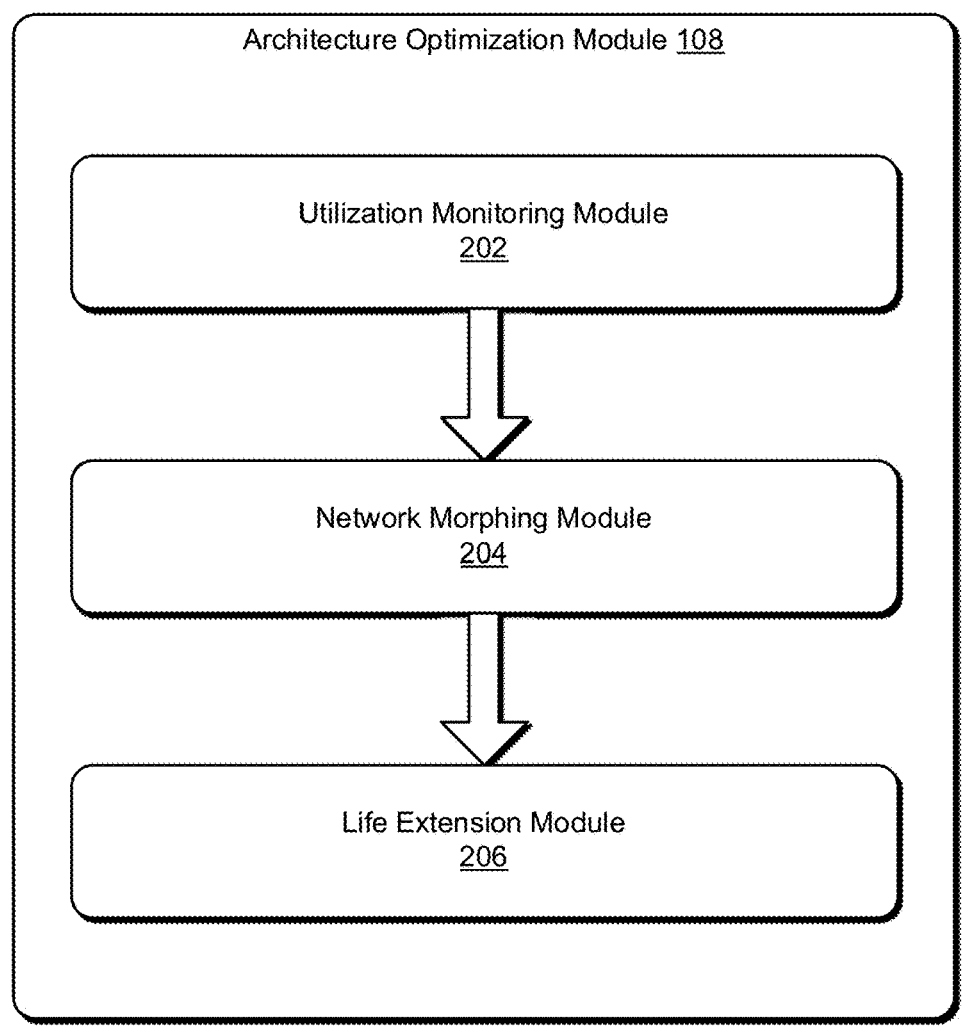
FIG. 2 depicts a system in an example implementation showing operation of an architecture optimization module.

FIG. 2 depicts a system 200 in an example implementation showing operation of an architecture optimization module 108. The architecture optimization module 108 is illustrated to include a utilization monitoring module 202, a network morphing module 204, and a life extension module 206. Although illustrated as separate modules, the functionality of these modules can be achieved by a single module or by additional submodules. The utilization monitoring module 202 is implemented to identify dead neurons of the neural network 110 which are neurons that can be removed from the neural network 110 without significantly impacting the network's performance in reliably accomplishing a task. For example, the utilization monitoring module 202 may detect dead neurons using the scale parameter $\gamma$ from the following equations (which a batch normalization layer uses to normalize outputs of a convolutional layer before the batch normalization layer):

$$\hat{z} = \frac{z_{in} - \mu_\beta}{\sqrt{\sigma_\beta^2 + \epsilon}}; z_{out} = \gamma \hat{z} + \beta$$

where: $z_{in}$ is an input to the batch normalization layer; $z_{out}$ is an output of the batch normalization layer; $\beta_\beta$ and $\sigma_\beta$ are the respective mean and standard deviation values of input activations over $\beta$; and $\gamma$ and $\beta$ are trainable affine transformation parameters (scale and shift). In another example, the utilization monitoring module 202 may define a neuron as a dead neuron if:

$$\gamma - t \cdot \gamma_{max}$$

where: $\gamma_{max}$ is a maximum $\gamma$ in a same batch normalization layer and t is a threshold, e.g., one percent. Other thresholds are also contemplated.

The utilization monitoring module 202 may also be implemented to use the following regularizer to encourage sparsity of live neurons:

$$L = \sum_{(x,y)} l(f(x, W), y) + \lambda \sum_{\gamma \in \tau} g(\gamma)$$

where: (x, y) represents the training samples in the dataset; l(f(x, W), y) is the loss function with parameter W; and g($\gamma$) is the L1 regularizer applied on all the $\gamma$ with a hyperparameter $\lambda$.

The network morphing module 204 is implemented to add dead neurons to layers of the neural network 110 with survived neurons. For example, the network morphing module 204 may expand a width O of survived neurons linearly by a maximum expansion rate $\omega$ under a resource limit $\zeta$ which can be expressed as:

$$\mathcal{F}_{(\omega \cdot O) \leq \zeta}$$

where: $\mathcal{F}$ computes resource consumption after expanding the width from O to $\omega \cdot O$.

The life extension module 206 is implemented to prevent reborn neurons from connecting to survived neurons so that reborn neurons do not become dead neurons again. This is necessary because the survived neurons have at least some training while the reborn neurons have just been reinitialized and are only able to contribute noise. Since they are not able to contribute to performance of the task, the neural network 110 will avoid using the reborn neurons and thus the reborn neurons will become dead neurons again.

For example, input neurons and output neurons within a convolution layer can be grouped into: survived input neurons $X_S$, reborn input neurons $X_R$, survived output neurons $Y_S$, and reborn output neurons $Y_R$. By example definition, $f_{S \to S}(X_S)$ is a convolutional operation from survived input neurons to survived output neurons, $f_{S \to R}(X_S)$ is from survived input neurons to reborn output neurons, $f_{R \to S}(X_R)$ is from reborn input neurons to survived output neurons, and $f_{R \to R}(X_R)$ is from reborn input neurons to reborn output neurons. In one or more implementations, the life extension module 206 prevents the reborn neurons from connecting to the survived neurons in accordance with the following expressions:

$$Y_S = f_{S \to S}(X_S) + f_{R \to S}(X_R); \quad Y_R = f_{S \to R}(X_S) + f_{R \to R}(X_R)$$

$$f_{S \to R}(\cdot) = 0 \text{ and } f_{R \to S}(\cdot) = 0$$

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures and Representations

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

Figure 3:
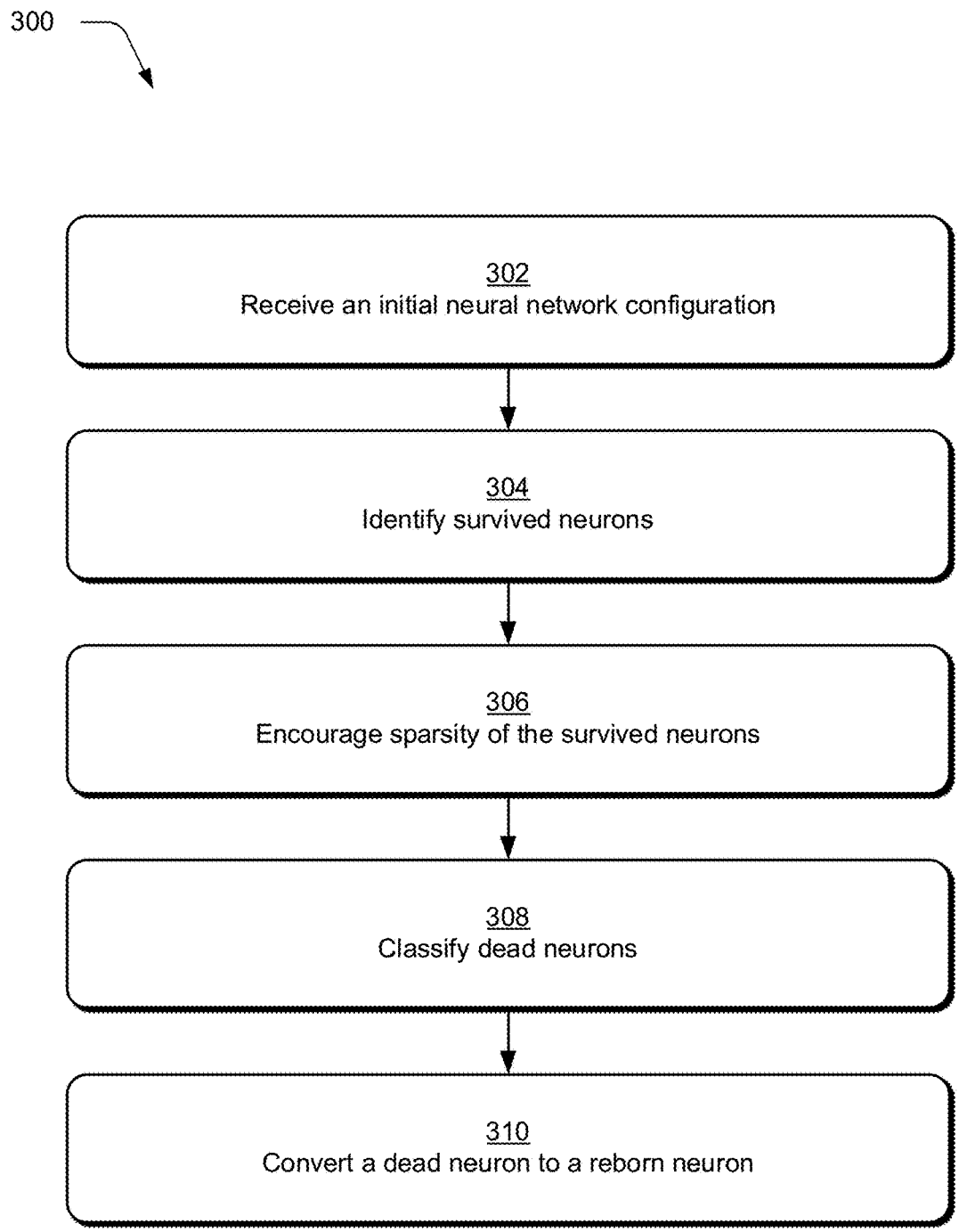
FIG. 3 is a flow diagram depicting a procedure in an example implementation in which dead neurons are classified and a dead neuron is converted to a reborn neuron.

FIG. 3 is a flow diagram depicting a procedure 300 in an example implementation in which dead neurons are classified and a dead neuron is converted to a reborn neuron. An initial neural network configuration is received (block 302). For example, the architecture optimization module 108 can receive the initial neural network configuration. The initial neural network configuration has a defined architecture including a number of layers and a number of channels of the network. However, the initial neural network configuration is inefficient in terms of computational resource utilization because only a fraction of the computations the network performs are useful in accomplishing a particular task. In other words, the initial neural network configuration is over-parameterized, and as a result of these computational inefficiencies, the initial neural network configuration is not well-suited for use on devices that have limited computational resources such as mobile devices.

In order to improve the initial neural network configuration, the utilization monitoring module 202 identifies survived neurons (block 304) as being neurons that have an activation scale that is greater than or equal to a threshold. Neurons having an activation scale that is greater than or equal to the threshold indicates that the neurons are useful to the neural network 110 for accomplishing a task. For example, the threshold can be one percent of the maximum activation scale of all neurons of the neural network 110. Other thresholds are contemplated. The utilization monitoring module 202 identifies these activation scales from batch normalization data and also imposes sparsity on the activation scales. Thus, the utilization monitoring module 202 encourages sparsity of the survived neurons (block 306). For example, the utilization monitoring module 202 may use L1-norm to achieve sparsity of the survived neurons. Other means of encouraging sparsity are also contemplated.

The utilization monitoring module 202 classifies dead neurons (block 308). The dead neurons are neurons that do not have an activation scale equal to or greater than the threshold. Thus, the dead neurons contribute little to the neural network 110. The network morphing module 204 is implemented to convert a dead neuron to a reborn neuron (block 310). In other words, the dead neurons are not helping the neural network 110 accomplish the task so by converting a dead neuron to a reborn neuron, the network morphing module 204 is changing the initial neural network configuration because the dead neuron was useless in the initial configuration. Additionally, since the dead neurons are being converted to reborn neurons, the network morphing module 204 can control how many reborn neurons are added to the neural network 110 which directly affects resource usage of the computing device 102. This control provides an additional advantage over conventional techniques which can be particularly useful in a situation where computing device 102 has limited computing resources available.

Figure 4:
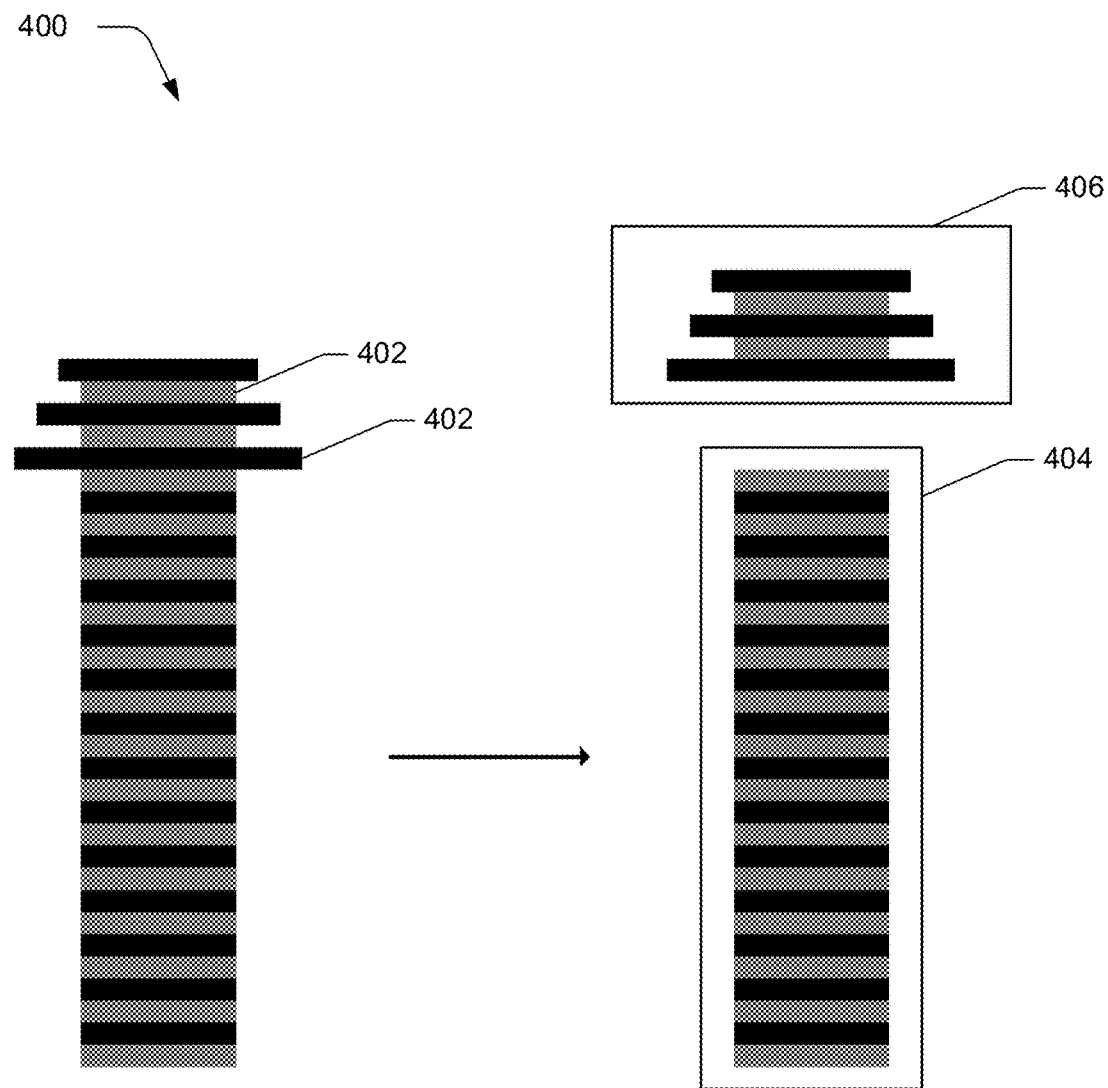
FIG. 4 is an illustration depicting a representation of an identification of survived neurons of a neural network.

FIG. 4 is an illustration depicting a representation 400 of an identification of survived neurons of a neural network. The representation 400 includes a neural network having neurons 402. These neurons 402 could be dead neurons or the neurons 402 could be survived neurons. The utilization monitoring module 202 is implemented to determine which neurons 402 are dead neurons and which neurons 402 are survived neurons. The representation 400 illustrates that the utilization monitoring module 202 identified dead neurons 404 and survived neurons 406 from the neurons 402. As shown in FIG. 4, a significant portion of the neurons 402 are dead neurons 404 which causes the neural network 110 to be computationally inefficient. These dead neurons 404 have activation scales that are less than the threshold and do not contribute meaningfully to the neural network 110's ability to achieve a corresponding task. The survived neurons 406 have activation scales greater than or equal to the threshold. As shown in FIG. 4, a relatively small number of the neurons 402 are survived neurons 406.

Figure 5:
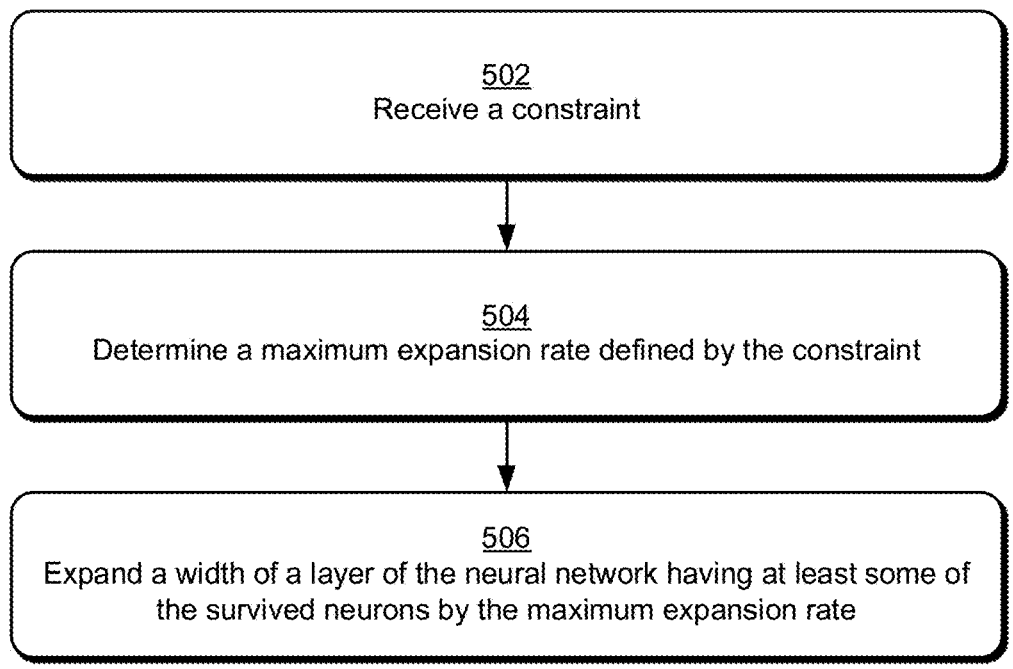
FIG. 5 is a flow diagram depicting a procedure in an example implementation in which a width of a layer of a neural network having survived neurons is expanded.

FIG. 5 is a flow diagram depicting a procedure 500 in an example implementation in which a width of a layer of a neural network having survived neurons is expanded. The architecture optimization module 108 receives a constraint (block 502). The constraint may be on a computing resource of computing device 102. For example, the constraint can be a resource limit In one or more embodiments, the constraint may correspond to a number of parameters, a number of floating point operations per second (FLOPS), etc.

The network morphing module 204 is implemented to determine a maximum expansion rate based on the constraint (block 504). The network morphing module 204 is implemented to expand a width of a layer of the neural network 110 having survived neurons by the maximum expansion rate (block 506). In one or more embodiments, the network morphing module 204 expands the width of the layer linearly. Alternatively, the network morphing module 204 expands the width of the layer non-linearly to the extent that the constraint allows, for example, the network morphing module 204 can expand the width of the layer exponentially.

Figure 6:
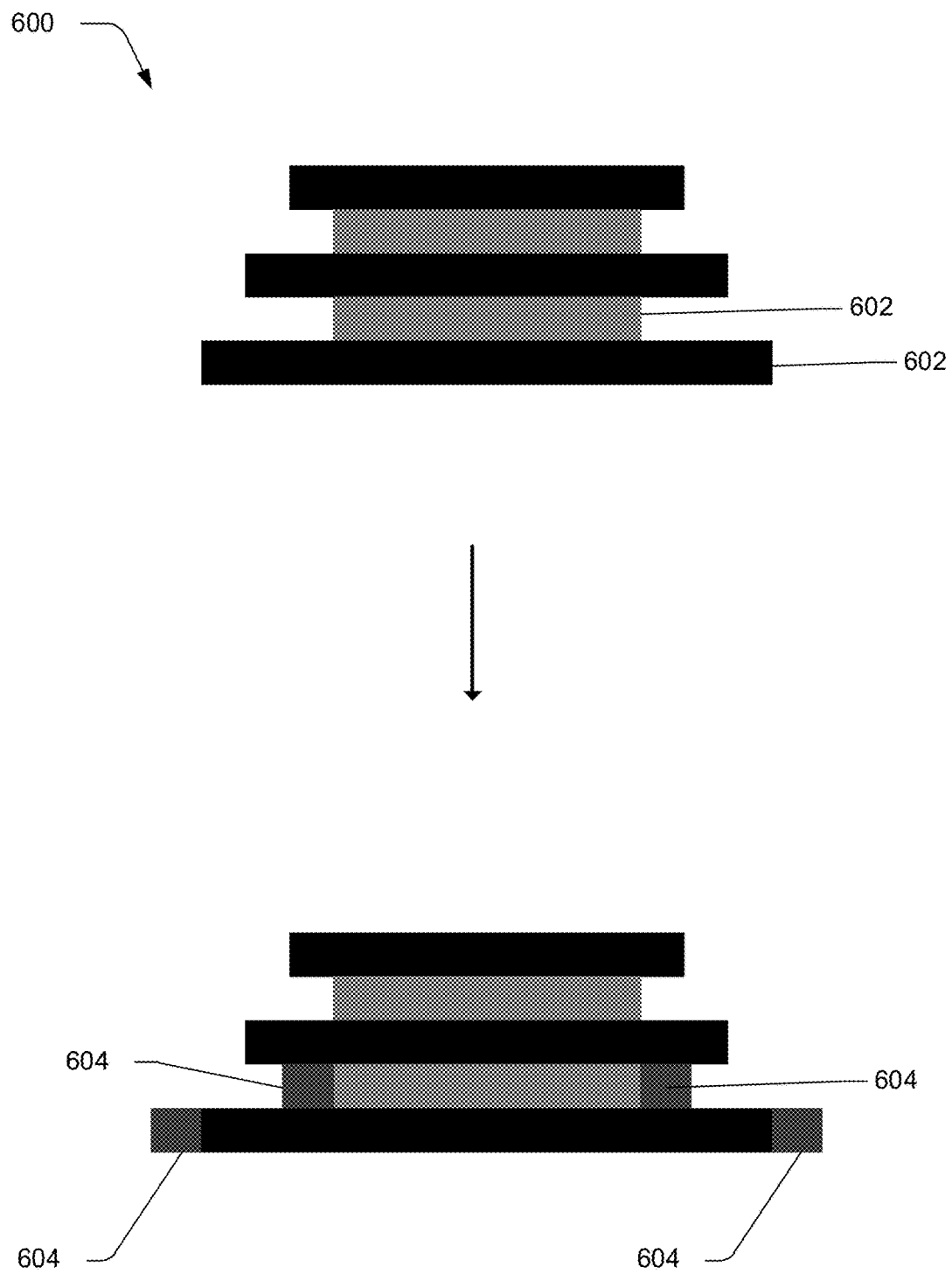
FIG. 6 is an illustration depicting a representation of an addition of dead neurons to a layer of a neural network having survived neurons.

FIG. 6 is an illustration depicting a representation 600 of an addition of dead neurons to a layer of a neural network having survived neurons. The representation illustrates survived neurons 406 before and after expanding widths of layers. The survived neurons 406 include layers 602 and the network morphing module 204 is implemented to expand the widths of these layers 602 by adding dead neurons to the layers 602. Once added to a layer 602, the dead neurons 404 are reborn neurons 604.

The network morphing module 204 may be implemented to linearly expand the widths of layers 602 by adding reborn neurons 604 to the layers 602. For example, the network morphing module 204 may be implemented to linearly expand the widths of layers 602 by adding as many reborn neurons 604 to the layers 602 as the constraint allows. In this way, the architecture optimization module 108 may allocate reborn neurons 604 based on the needs of the neural network 110.

Figure 7:
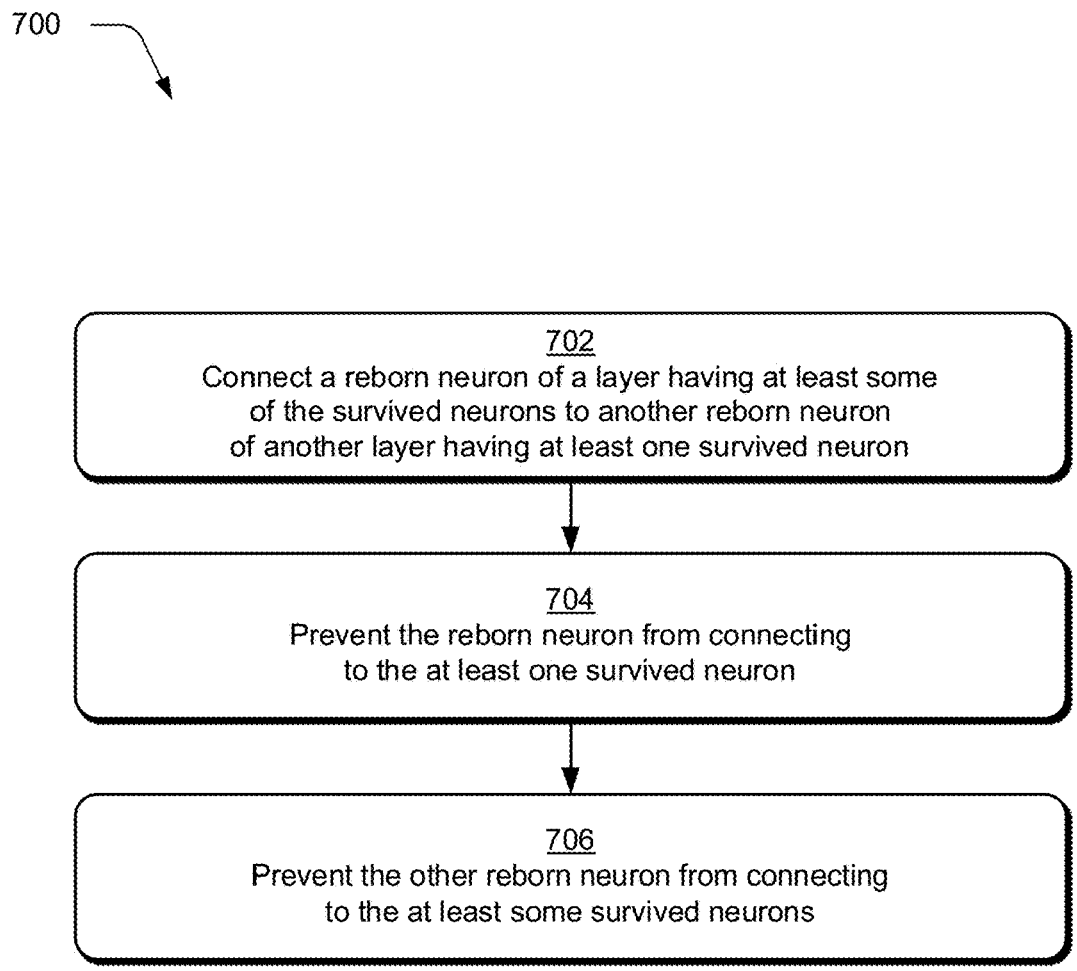
FIG. 7 is a flow diagram depicting a procedure in an example implementation in which reborn neurons are prevented from connecting to survived neurons.

FIG. 7 is a flow diagram depicting a procedure 700 in an example implementation in which reborn neurons are prevented from connecting to survived neurons. The life extension module 206 is implemented to connect a reborn neuron 604 that has been added to a layer 602 to another reborn neuron 604 that has been added to another layer 602 (block 702). However, the reborn neurons will die again if the life extension module 206 treats the reborn neurons 604 in the same manner as the survived neurons 406 for the same reason that the reborn neurons 604 were dead neurons 404 before being added to the widths of the layers. This means that the survived neurons 406 are already performing in the neural network 110 and have at least some training but the reborn neurons 604 have just been reinitialized and have no training yet. Thus, the reborn neurons 604 would only contribute noise to the neural network 110 and would eventually become inactive such that the reborn neurons 604 would have activation scales less than the threshold.

In order to prevent the reborn neurons 604 from becoming dead neurons 404 again, the life extension module 206 is implemented to prevent the reborn neuron 604 from connecting to the survived neurons 406 (block 704) and the life extension module 206 is also implemented to prevent the other reborn neuron 604 from connecting to the survived neurons 406 (block 706). In this manner, the life extension module 206 allows the reborn neuron 604 and the other reborn neuron 604 to be trained independently of the survived neurons 406. Although this training comes at the cost of reducing the number of parameters available in the neural network 110 by about half. In other words, by preventing the reborn neurons 604 from connecting to the survived neurons 406 the neural network 110 has half the connections available as it would have if the reborn neurons 604 are connected to the survived neurons 406.

Figure 8:
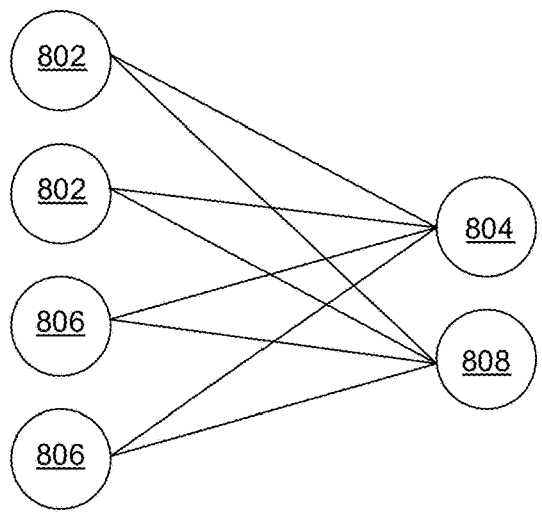
FIG. 8 is an illustration depicting a representation of survived neurons and reborn neurons in a neural network.
Figure 8:
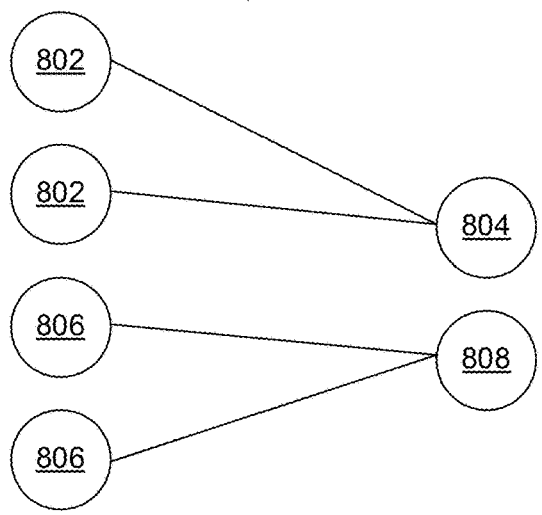

FIG. 8 is an illustration depicting a representation 800 of survived neurons and reborn neurons in a neural network. As shown in FIG. 8, the representation 800 includes input survived neurons 802 and an output survived neuron 804. The representation also includes input reborn neurons 806 and an output reborn neuron 808. The representation 800 is shown before and after the life extension module 206 prevents reborn neurons 604 from connecting to survived neurons 406. Before this prevention occurs, the input survived neurons 802 are connected to the output survived neuron 804 and the output reborn neuron 808, and the input reborn neurons 806 are connected to the output survived neuron 804 and the output reborn neuron 808.

As described above, this configuration would result in the reborn neurons 806 and 808 eventually becoming dead neurons 404 again because the survived neurons 802 and 804 are at least partially trained but the reborn neurons 806 and 808 have just been reinitialized and can only contribute noise until they are trained. After the life extension module 206 prevents reborn neurons 604 from connecting to survived neurons 406, the survived input neurons 802 are only connected to the survived output neuron 804 and the reborn input neurons 806 are only connected to the reborn output neuron 808. In this way, the reborn neurons 806 and 808 can be trained separately from the survived neurons 802 and 804 so that the neural network 110 can use the survived neurons to perform a task.

Figure 9:
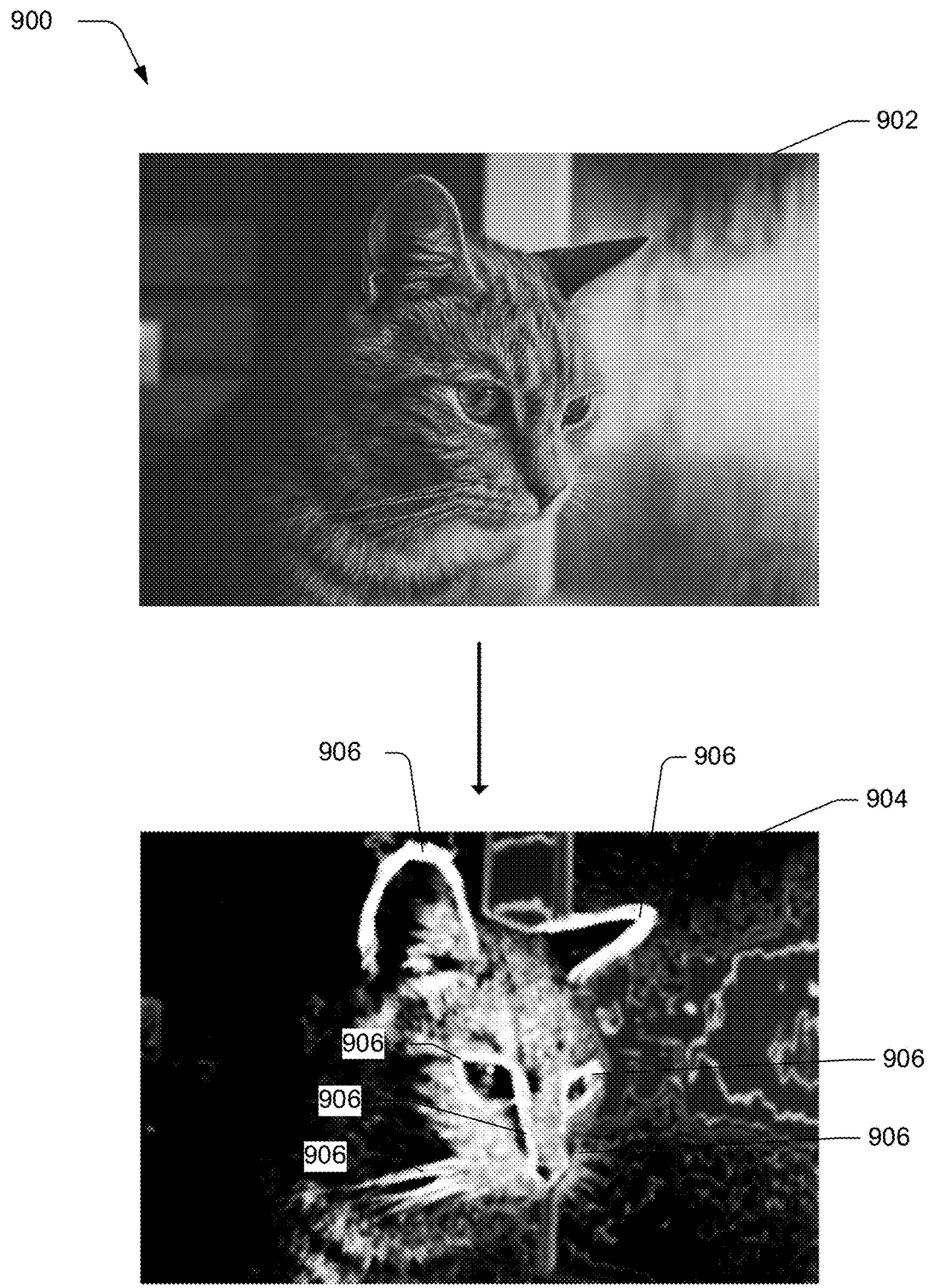
FIG. 9 is an illustration depicting a representation of generating an attention map from a training example.

FIG. 9 is an illustration depicting a representation 900 of generating an attention map from a training example. The representation 900 includes a training example 902 and an attention map 904 generated from the training example 902. For example, the training example 902 may be an image used to train the survived neurons 802 and 804. Alternatively, the training example 902 may be an image used to train the reborn neurons 806 and 808. The attention map 904 illustrates attentions of the training example 902. Attentions represent areas of focus of a neural network and are illustrated as the light portions in the attention map 904. These areas of focus can be areas corresponding to features of an object in the training example 902 that the neural network 110 can use to classify the object.

In this example, the training example 902 is an image of a cat and the attention map 904 illustrates attention regions 906 of the cat image. As shown in FIG. 9, the cat's ears, eyes and nose, and whiskers are features of the cat that correspond to attention regions 906 in the attention map 904. Neural network 110 may use one of these features to classify an object in the training example 902 as a cat. Although the neural network 110 may only use one feature to classify the cat, the training example 902 includes additional features which can also be used to classify the cat.

Figure 10:
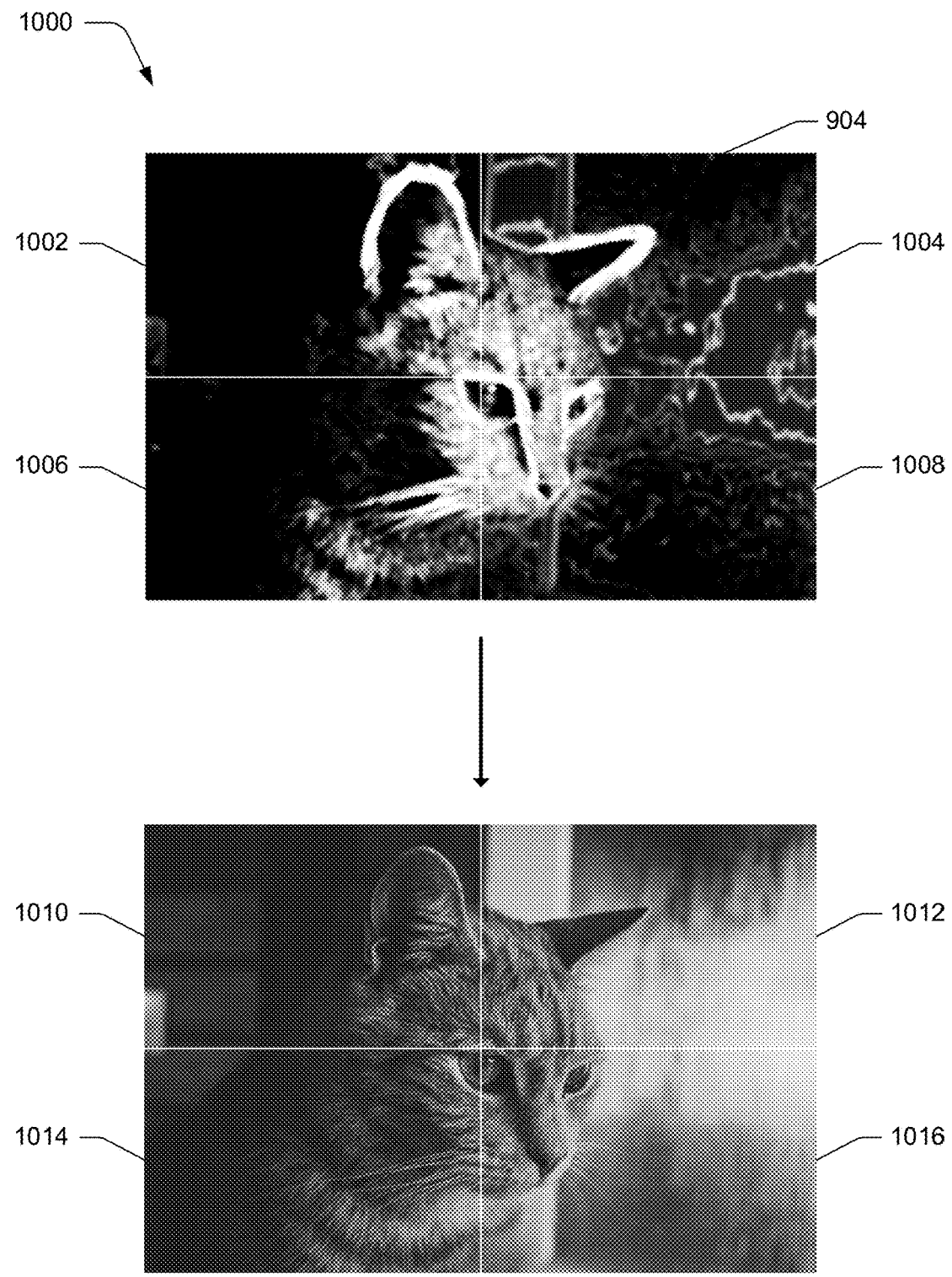
FIG. 10 is an illustration depicting a representation of sampling an attention map to generate an adversarial training example.

FIG. 10 is an illustration depicting a representation 1000 of sampling an attention map to generate an adversarial training example. A shown in FIG. 10, the attention map 904 is sampled into four regions 1002-1008 which correspond to regions 1010-1016 in the training example 902. Regions 1002-1008 separate the attention regions 906 (the lightest portions) of the attention map 904. In this example, sampled region 1002 corresponds to region 1010 in the training example 902 which contains most of one of the cat's ears. Sampled region 1004 corresponds to region 1012 which contains the cat's other ear. Similarly, sampled regions 1006 and 1008 correspond to regions 1014 and 1016, respectively, each of which contain features of the cat from the training example 902.

Figure 11:
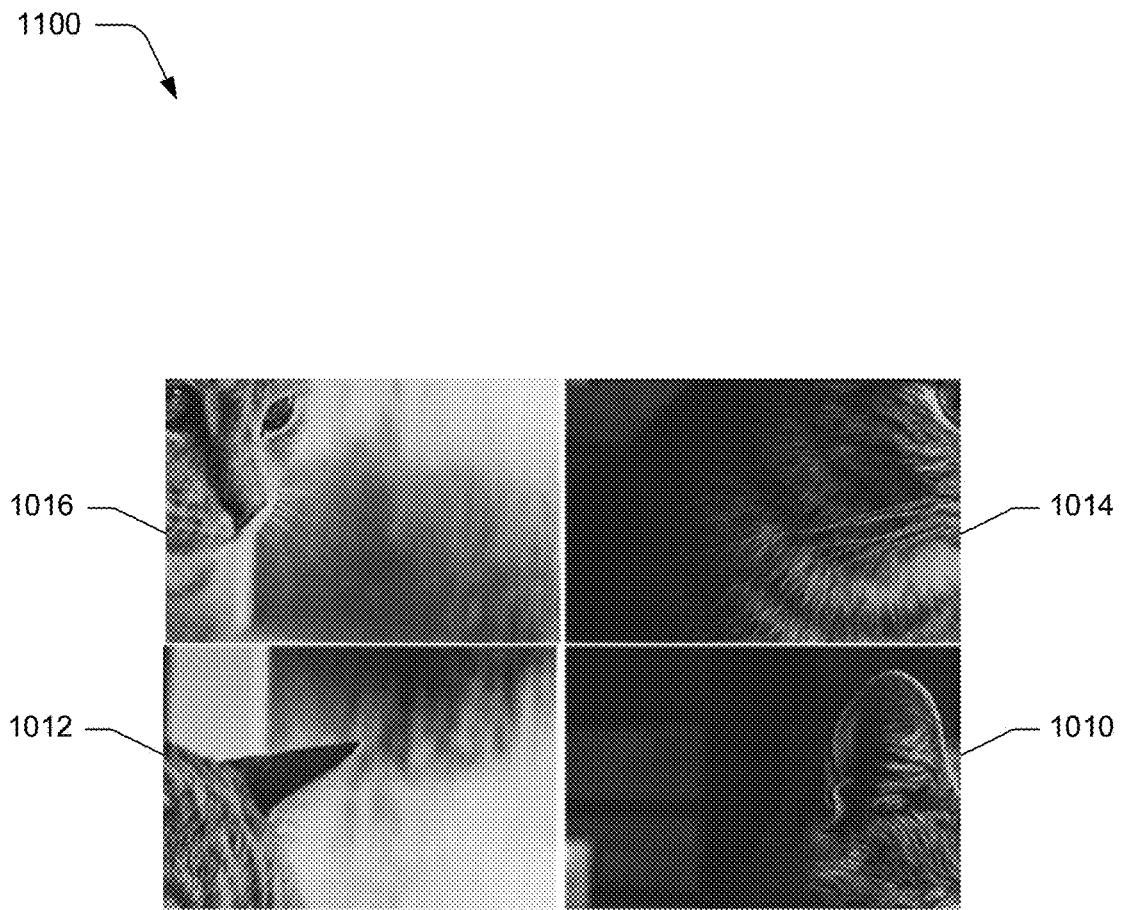
FIG. 11 is an illustration depicting a generated adversarial training example.

FIG. 11 is an illustration depicting a generated adversarial training example 1100. The adversarial training example 1100 has been generated by separating regions 1010-1016 and rearranging the regions to separate features of the object in the training example 902. In this way, the survived neurons 802 and 804 and the reborn neurons 806 and 808 can be trained with adversarial examples which can be expressed as:

$$\mathcal{L}_{dif}(x) = H(p_1(x), p_2(g_1(x))) + H(p_2(x), p_1(g_2(x)))$$

where: x represents data; H(p, q) is cross entropy between distribution p and q; and network $p_1$ is trained with adversarial training examples $g_2(x)$ of network $p_2$ and network $p_2$ is trained with adversarial training examples $g_1(x)$ of network $p_1$ to minimize $\mathcal{L}_{dif}(x)$.

Since the attention regions 906 are separated in the adversarial training example 1100, this forces the neurons trained with the adversarial training example 1100 to focus on different regions of the training example 902 for object recognition which encourages a view difference. For example, if the survived neurons 802 and 804 are trained using the training example 902, then the survived neurons 802 and 804 may classify the cat by focusing on both of the cat's ears. However, if the reborn neurons 806 and 808 are trained using the adversarial training example 1100, then the cat's ears are separated so the reborn neurons 806 and 808 must focus on something else to classify the cat. Thus, the reborn neurons 806 and 808 will make decisions based on complementary information.

For example, the reborn neurons 806 and 808 may focus on just one of the cat's ears as illustrated in region 1012 or in region 1010 to classify the cat, or the reborn neurons 806 and 808 may focus on the cat's whiskers as illustrated in region 1014 or in region 1016 to classify the cat. The different focus for classification is the view difference. By training the neurons in this way, the survived neurons 802 and 804 and the reborn neurons 806 and 808 can make decisions based on complementary information. Thus, by forcing the survived neurons 802 and 804 and the reborn neurons 806 and 808 to focus on different regions of the training example 902 to make classifications, the efficacy of the neural network 110 is further improved.

In other words, the life extension module 206 prevents reborn neurons 604 from connecting to survived neurons 406 so that the survived input neurons 802 are only connected to the survived output neuron 804 and the reborn input neurons 806 are only connected to the reborn output neuron 808. This prevents the reborn neurons 806 and 808 from eventually becoming dead neurons 404 again and also improves the performance of neural network 110 even though the network has half the connections available as it would have if the reborn neurons 604 are connected to the survived neurons 406. Additionally, the reborn neurons 806 and 808 are trained separately from the survived neurons 802 and 804 so that the neural network 110 can use the survived neurons and the reborn neurons to perform a task.

In one or more embodiments, the survived neurons 802 and 804 can be trained with a first set of training examples and the reborn neurons 806 and 808 can be trained with a second set of training examples where the first and second sets are unrelated. Alternatively, the reborn and survived neurons can each be trained with adversarial training examples 1100 of the other to produce and utilize different and complementary information. In this way, the performance of the neural network 110 is improved further, and the separate training of the survived and reborn neurons is also accomplished.

Example System and Device

Figure 12:
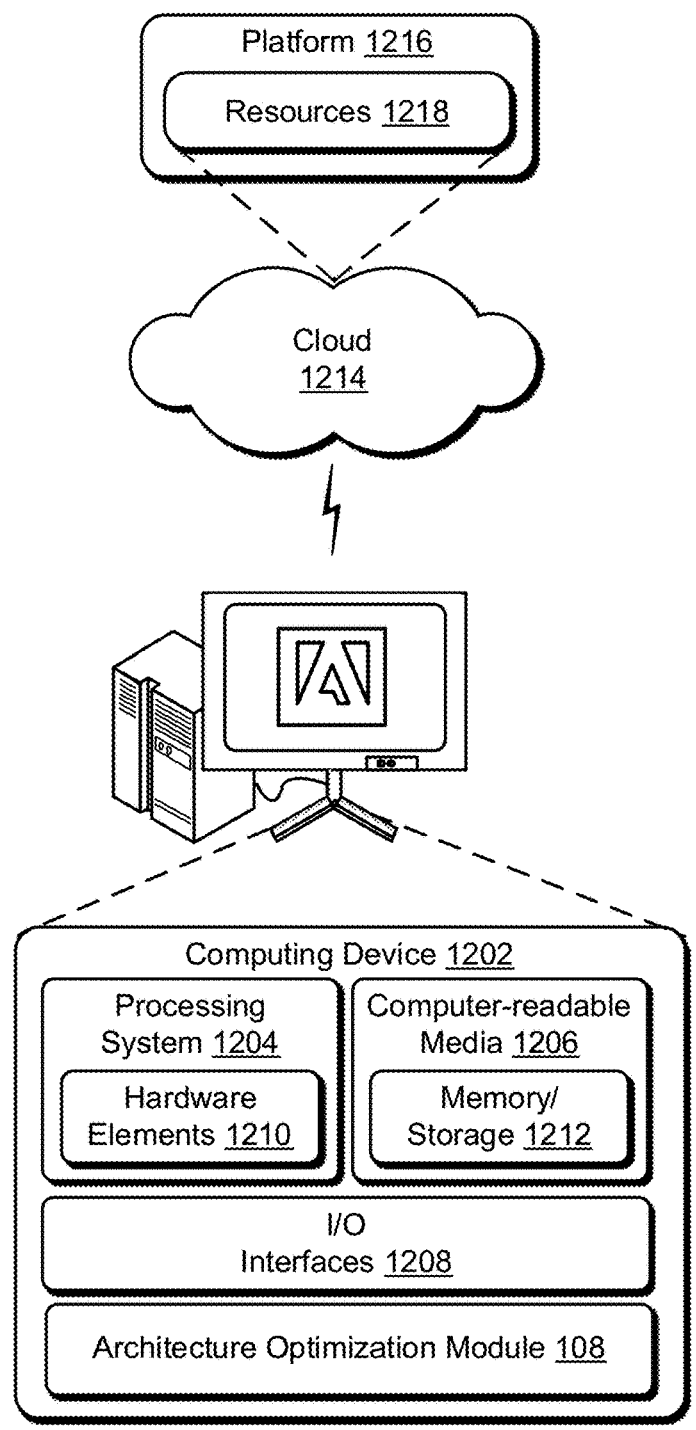
FIG. 12 illustrates an example system that includes an example computing device that is representative of one or more computing systems and/or devices that may implement the various techniques described herein.

FIG. 12 illustrates an example system generally at 1200 that includes an example computing device 1202 that is representative of one or more computing systems and/or devices that may implement the various techniques described herein. This is illustrated through inclusion of the architecture optimization module 108. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources 1218 and functions to connect the computing device 1202 with other computing devices. The platform 1216 may also serve to abstract scaling of resources 1218 to provide a corresponding level of scale to encountered demand for the resources that are implemented via the platform 1216. Accordingly, in an interconnected device embodiment, implementation of functionality described herein may be distributed throughout the system 1200. For example, the functionality may be implemented in part on the computing device 1202 as well as via the platform that abstracts the functionality of the cloud 1214.

CONCLUSION

Although the implementation of resource-aware training for neural networks has been described in language specific to structural features and/or methods, it is to be understood that the appended claims are not necessarily limited to the specific features or methods described. Rather, the specific features and methods are disclosed as example implementations of resource-aware training for neural networks, and other equivalent features and methods are intended to be within the scope of the appended claims. Further, various different examples are described and it is to be appreciated that each described example can be implemented independently or in connection with one or more other described examples.

What is claimed is:

1. In a digital medium environment to optimize architecture of a neural network, a method implemented by a computing device, the method comprising:
identifying survived neurons of the neural network, the survived neurons having an activation scale greater than or equal to a threshold;
identifying dead neurons of the neural network, the dead neurons having an activation scale less than the threshold;

adding a particular dead neuron to a layer of the neural network having at least some of the survived neurons; and training the survived neurons and the particular dead neuron separately by training the survived neurons on a set of training examples and training the particular dead neuron on adversarial training examples generated from the set of training examples.

2. The method as described in claim 1, further comprising adding an additional dead neuron to an additional layer of the neural network having at least one of the identified survived neurons.

3. The method as described in claim 2, wherein the particular dead neuron and the additional dead neuron are connected.

4. The method as described in claim 3, further comprising:
preventing the particular dead neuron from connecting to the at least one identified survived neuron; and
preventing the additional dead neuron from connecting to the at least some identified survived neurons.

5. The method as described in claim 1, wherein the threshold is determined as a percentage of a maximum neural activation scale.

6. The method as described in claim 1, wherein the adding comprises expanding a width of the layer of the neural network by a maximum expansion rate, the maximum expansion rate defined by a constraint on at least one computing resource of the computing device.

7. The method as described in claim 6, wherein the constraint is a defined resource limit.

8. In a digital medium environment to optimize architecture of a neural network, modules implemented at least partially in hardware of one or more computing devices of a system comprising:
a utilization monitoring module implemented to:
identify survived neurons of the neural network, the survived neurons having an activation scale greater than or equal to a threshold; and
identify dead neurons of the neural network, the dead neurons having an activation scale less than the threshold;
a network morphing module implemented to add a particular dead neuron to a layer of the neural network having at least some of the survived neurons; and
a life extension module implemented to train the survived neurons and the particular dead neuron separately by training the survived neurons on a set of training examples and training the particular dead neuron on adversarial training examples generated from the set of training examples.

9. The system as described in claim 8, wherein the network morphing module is implemented to add an additional dead neuron to an additional layer of the neural network having at least one of the identified survived neurons.

10. The system as described in claim 9, wherein the particular dead neuron is connected to the additional neuron.

11. The system as described in claim 10, wherein the life extension module is implemented to prevent the particular dead neuron from connecting to the at least one identified survived neuron and prevent the additional dead neuron from connecting to the at least some identified survived neurons.

12. The system as described in claim 8, wherein the threshold is determined as a percentage of a maximum neural activation scale.

13. The system as described in claim 8, wherein the network morphing module is implemented to expand a width of the layer of the neural network by a maximum expansion rate, the maximum expansion rate defined by a constraint on at least one computing resource of the one or more computing devices.

14. The system as described in claim 13, wherein the constraint is a defined resource limit.

15. In a non-transitory computer-readable medium to optimize architecture of a neural network, a computer implemented method comprising:
a step for identifying survived neurons of the neural network;
a step for identifying dead neurons of the neural network;
adding a particular dead neuron to a layer of the neural network having at least some of the identified survived neurons;
adding an additional dead neuron to an additional layer of the neural network having at least one of the survived neurons; and
training the survived neurons and the particular dead neuron separately by training the survived neurons on a set of training examples and training the particular dead neuron on adversarial training examples generated from the set of training examples.

16. The method as described in claim 15, wherein the particular dead neuron and the additional dead neuron are connected.

17. The method as described in claim 15, further comprising a step for determining a maximum neural activation scale.

18. The method as described in claim 15, further comprising a step for expanding a width of the layer of the neural network by a maximum expansion rate, the maximum expansion rate defined by a constraint on at least one computing resource of a computing device.

19. The method as described in claim 18, wherein the expanding is linear.

20. The method as described in claim 18, wherein the constraint is a defined resource limit.

* * * * *